United States Patent Office 2,860,156
Patented Nov. 11, 1958

2,860,156

PENTAERYTHRITOL TRINITRATE HALF ESTERS OF DICARBOXYLIC ACIDS

William N. Cannon, Greenwood, Ind., assignor to Eli Lilly and Company, Indianapolis, Ind., a corporation of Indiana No Drawing. Application April 4, 1955
Serial No. 499,210

4 Claims. (Cl. 260—467)

This invention relates to novel acid-esters and more particularly to the mono pentaerythritol trinitrate esters of lower aliphatic dicarboxylic acids.

It has long been known that some of the lower aliphatic polyhydric alcohols fully esterified with nitric acid are useful coronary dilator substances. Such compounds include glyceryl trinitrate, mannitol hexanitrate and pentaerythritol tetranitrate. These compounds, while highly effective as coronary dilators, have certain disadvantages. Among these disadvantages are short duration of action, absorption only via the sub-lingual route, extremely low water solubility and uncertainty of dosage.

It is an object of this invention to provide effective coronary dilator substances which avoid the above disadvantages. Other objects of my invention will be apparent from the following disclosure.

I have discovered that the mono pentaerythritol trinitrate esters of lower aliphatic dicarboxylic acids possess highly useful pharmacological properties. When administered orally, the foregoing compounds exhibit a prolonged coronary dilator activity. Moreover, some of the compounds are especially useful as hypotensive agents, providing a prolonged hypotensive effect with freedom from undesirable tachycardia. Additionally, the compounds cause effective relaxation of internal ducts such as the sphincter of Oddi, thus making them useful for the relief of biliary colic, and other similar conditions.

The lower aliphatic dicarboxylic acids useful in preparing the mono pentaerythritol trinitrate esters of this invention are those which are capable of forming internal anhydrides and embrace those acids having a total of 4 to 9 carbon atoms. Illustratively, they include succinic and glutaric acids and their substitution products. Among these substituted acids, however, I prefer to employ only those which are substituted by lower alkyl groups, as for example, by methyl, ethyl, and propyl groups. Among the lower aliphatic dicarboxylic acids useful in making the compounds of this invention are succinic acid, glutaric acid, $\alpha$-methyl succinic acid, $\alpha,\beta,\gamma$-trimethyl glutaric acid, $\alpha,\beta$-dimethyl succinic acid, $\beta$-methyl glutaric acid, $\beta$-ethyl glutaric acid, $\beta$-propyl glutaric acid, $\beta$-isopropyl glutaric acid, $\alpha,\beta$-diethyl succinic acid, $\beta,\beta$-diethyl glutaric acid, and the like. The higher aliphatic dicarboxylic acids can be employed, but are less desirable because they are not readily obtainable as acid anhydrides or mono-acid chlorides for reaction purposes.

Although the half pentaerythritol trinitrate esters of the lower aliphatic dicarboxylic acids provided by this invention are relatively water-soluble, it is possible to increase their water-solubility by forming salts with the unreacted carboxylic acid group. These salts can be formed with cations which customarily yield water-soluble salts with aliphatic carboxylic acids. For therapeutic purposes, the salts are equivalent to the acid-esters, and are included within the scope of this invention.

The pharmaceutically useful salts are those which are not substantially more toxic than the acids from which they are derived and which can be incorporated in pharmaceutical extending media, liquid or solid, for the preparation of therapeutically useful compositions. Illustrative examples of suitable salts include those of the alkali metals, e. g., sodium and potassium, the alkaline earth metals, e. g., calcium, and ammonium and substituted ammonium radicals.

The mono pentaerythritol trinitrate esters of lower aliphatic dicarboxylic acids, as described hereinabove, can be prepared by the usual procedures known to the art for preparing such mono esters. Among the available procedures is the reaction between either a cyclic anhydride or a half acid chloride of the lower aliphatic dicarboxylic acid and the free alcohol group of pentaerythritol trinitrate. The reaction is carried out by reacting the cyclic acid anhydride or the mono-acid chloride with the pentaerythritol trinitrate in an inert solvent and then heating the mixture to cause the reaction to proceed at a suitable rate. Among the inert solvents which are useful in this preparation are acetone, pyridine, dioxan, benzene, and the like. After the esterification is complete, the half ester is isolated by the standard procedures of organic chemistry, as for example, by evaporation of the organic solvent in vacuo, solution of the half ester in aqueous base as an alkali metal salt, extraction of this aqueous layer to remove by-products, acidification of the aqueous layer followed by filtration of the solid half ester, and crystallization of the half ester from an organic solvent.

This invention is further illustrated by the following examples:

EXAMPLE 1

*Preparation of pentaerythritol trinitrate hydrogen succinate*

A mixture of 5.4 g. of pentaerythritol trinitrate and 2 g. of succinic anhydride was prepared in 30 ml. of dry acetone as a solvent. This mixture was heated at refluxing temperature for 4 hours. After cooling, the acetone was removed by evaporation in vacuo. The resultant viscous residue comprising pentaerythritol trinitrate hydrogen succinate, and minor amounts of unreacted starting materials, was dissolved in an excess of aqueous sodium bicarbonate solution thus forming the sodium salt of the pentaerythritol trinitrate hydrogen succinate. Diethyl ether was added to the aqueous solution, the two phases were mixed thoroughly, and the aqueous phase was separated and filtered. The alkaline aqueous phase was then acidified with concentrated hydrochloric acid. An oily material comprising pentaerythritol trinitrate hydrogen succinate separated. This oil was crystallized by chilling it and rubbing it against the side of the flask with a glass rod. The resulting crystals were filtered, were washed with cold water, and were dried, thus yielding 2.7 g. of pentaerythritol trinitrate hydrogen succinate as a white crystalline solid which melted at about 91–92° C. Recrystallization of this solid from ethanol gave crystals melting at about 92–92.5° C.

*Analysis.*—Calc'd for $C_9H_{13}N_3O_{13}$: C, 29.12; H, 3.53; N, 11.32. Found: C, 29.17; H, 3.62; N, 10.94.

A second synthesis carried out as above but using a 100 percent excess of succinic anhydride and a refluxing time of 8 hours gave a final yield of 83.5 percent as compared with the 36.5 percent obtained in the above synthesis.

EXAMPLE 2

*Preparation of pentaerythritol trinitrate hydrogen glutarate*

A synthesis carried out in the manner of the first paragraph of Example 1 but using glutaric anhydride in place of succinic anhydride yielded pentaerythritol trinitrate hydrogen glutarate as an oil in 41.5 percent yield. This oil was crystallized in the same manner as in Example 1. The white crystalline pentaerythritol trinitrate hydrogen glutarate thus obtained was recrystallized three times from ethanol and then had a melting point of about 87–88° C.

*Analysis.*—Calc'd for $C_{10}H_{15}N_3O_{13}$: C, 31.17; H, 3.92; N, 10.90. Found: C, 31.33; H, 4.09; N, 10.83.

Another preparation carried out in the same manner but employing a 100 percent excess of glutaric anhydride and a 24-hour reflux period gave a yield of 85.5 percent of crystalline pentaerythritol trinitrate hydrogen glutarate.

EXAMPLE 3

*Preparation of pentaerythritol trinitrate hydrogen β,β-methyl glutarate*

A reaction was carried out following the method of paragraph 1 of Example 1 except that β,β-dimethyl glutaric anhydride was used in place of succinic anhydride. Pentaerythritol trinitrate hydrogen β,β-dimethyl glutarate was obtained as a white crystalline solid in 27.1 percent yield. The melting point of pentaerythritol trinitrate hydrogen β,β-dimethyl glutarate, after two crystallizations from n-propanol, was about 71.5–72° C.

*Analysis.*—Calc'd for $C_{12}H_{19}N_3O_{13}$: C, 34.87; H, 4.63; N, 10.17. Found: C, 34.96; H, 4.94; N, 9.83.

I claim:

1. The mono pentaerythritol trinitrate ester of a saturated lower aliphatic dicarboxylic acid selected from the class consisting of succinic and glutaric acids and lower alkyl substituted succinic and glutaric acids, said acid having a total of not more than 9 carbon atoms.

2. The mono pentaerythritol trinitrate ester of succinic acid.

3. The mono pentaerythritol trinitrate ester of glutaric acid.

4. The mono pentaerythritol trinitrate ester of β,β-dimethyl glutaric acid.

No references cited.